United States Patent Office 3,138,530
Patented June 23, 1964

3,138,530
COMPOSITION CONTAINING MONO - HYDROXY ALUMINUM - DI - ACETYLSALICYLATE, CAFFEINE, 3,3 - DIETHYL - 5 - METHYL - 2, 4 - PIPERIDINEDIONE AND 1 - (4 - CHLOROPHENETHYL) - 2 - METHYL - 6,7 - DIMETHOXY - 1,2,3, 4 - TETRAHYDROISOQUINOLINE
Saul Howard Rubin, Nutley, and John James Vance, Park Ridge, N.J., assignors to Hoffmann-La Roche Inc., Nutley, N.J., a corporation of New Jersey
No Drawing. Filed May 2, 1962, Ser. No. 191,743
10 Claims. (Cl. 167—55)

This application relates, in general, to novel therapeutic compositions. More particularly, it relates to compositions comprising 1-(4-chlorophenethyl)-2-methyl-6,7-dimethoxy-1,2,3,4-tetrahydroisoquinoline, or a salt formed by reacting that base with a medicinally acceptable acid, in admixture with monohydroxy aluminum di-acetylsalicylate.

1 - (4 - chlorophenethyl)-2-methyl-6,7-dimethoxy-1,2,3, 4-tetrahydroisoquinoline, and its medicinally acceptable acid addition salts, are known compounds. Moreover, processes for the production of such compounds are disclosed in the art. Additionally, mono-hydroxy aluminum di-acetylsalicylate, or, as it will be referred to hereinafter, aluminum acetylsalicylate, is a known compound and processes for its production are disclosed in the art.

It has been found that when 1-(4-chlorophenethyl)-2-methyl-6,7-dimethoxy-1,2,3,4-tetrahydroisoquinoline, or a medicinally acceptable acid addition salt thereof, is used in admixture with aluminum acetylsilicylate, compositions having a very high degree of analgesic activity are obtained. 1-(4-chlorophenethyl)-2-methyl-6,7-dimethoxy-1, 2,3,4-tetrahydroisoquinoline, and its acid addition salts, are known to possess analgesic activity. It has now been found that, when that compound, or one of its medicinally acceptable acid addition salts, is administered in combination with aluminum acetylsalicylate, a totally unexpected potentiation of its analgesic activity takes place.

Thus, in its most comprehensive embodiment, the present invention is concerned with therapeutic compositions comprising 1 - (4-chlorophenethyl)-2-methyl-6,7-dimethoxy-1,2,3,4-tetrahydroisoquinoline, and medicinally acceptable acid addition salts thereof, in admixture with aluminum acetylsalicylate.

In certain of its more particular embodiments, the invention is concerned with compositions which contain, in addition to the aforementioned compounds, other therapeutically active ingredients.

Additionally, the invention is concerned with the formulation of the various compositions in dosage forms which are suitable for oral administration.

The compositions of this invention are readily produced. For example, products suitable for filling into hard-shell capsules can be obtained by mixing 1-(4-chlorphenethyl)-2-methyl-6,7-dimethoxy-1,2,3,4-tetrahydroisoquinoline, or a medicinally acceptable acid addition salt thereof, with aluminum acetylsalicylate. In the present specification, the expression "medicinally acceptable acid addition salt" is used to denote salts formed by reacting the aforementioned tetrahydroisoquinoline base with a medicinally acceptable acid. Salts of 1-(4-chlorophenethyl)-2-methyl-6,7,-dimethoxy-1,2,3,4-tetrahydroisoquinoline, which are fully suited for use include salts of medicinally acceptable inorganic acids, such as, salts of hydrochloric acid, hydrobromic acid, phosphoric acid, sulfuric acid, etc., and salts of medicinally acceptable organic acids, such as, salts of maleic acid, ascorbic acid, tartaric acid, etc. In producing the preferred products of the invention, however, 1-(4-chlorophenethyl) - 2 - methyl-6,7-dimethoxy-1,2,3,4-tetrahydroisoquinoline, or a hydrohalide salt thereof, such as, the hydrochloride, hydrobromide, etc., salt, is employed.

As indicated heretofore, the products of this invention can contain, in addition to 1-(4-chlorophenethyl)-2-methyl - 6,7-dimethoxy-1,2,3,4-tetrahydroisoquinoline, or an acid addition salt thereof, and aluminum acetylsalicylate, other therapeutically active compounds as optional ingredients. It has been found, for example, that preparations, which have a non-narcotic, sedative-hypnotic, such as, 3,3 - diethyl - 5 - methyl-2,4-piperidinedione, incorporated therein, have extremely useful properties. Additionally, preparations which have present therein a stimulant such as caffeine have been found to be very valuable.

As indicated heretofore, the compositions of this invention can be formulated in a form suitable for filling into capsules. Additionally, the preparations can be formulated in such a manner that they can be compressed into tablets. In producing such dosage forms, one can use any of the adjuvants customarily employed in the preparation of medicinal tablets and capsules. For example, fillers, such as cornstarch, lactose, dicalcium phosphate, and disintegrating agents, such as maize starch, and lubricating agents, such as talc, calcium stearate, etc., can be used in producing the dosage forms of the compositions. A detailed description of the manner in which the various dosage forms of the present compositions are produced will be given hereinafter.

The ratio of 1-(4-chlorophenethyl)-2-methyl-6,7-dimethoxy-1,2,3,4-tetrahydroisoquinoline, or an acid addition salt thereof, to aluminum acetylsalicylate used in producing the compositions of the present invention can be varied within rather wide limits. For example, in formulating these preparations, one may use from about 4.0 to to 20.0 parts by weight of aluminum acetylsalicylate for each part by weight of 1-(4-chlorophenethyl)-2-methyl-6,7-dimethoxy-1,2,3,4-tetrahydroisoquinoline, or salt thereof, present therein. Preferably, however, from about 6.0 to about 15.0 part by weight of aluminum acetylsalicylate will be used for each 1.0 part by weight of 1-(4-chlorophenethyl) - 2 - methyl-6,7-dimethoxy-1,2,3,4-tetrahydroisoquinoline, or salt thereof, present in the product. Where therapeutically active ingredients, other than 1-(4-chlorophenethyl) - 2 - methyl-6,7-dimethoxy-1,2,3,4-tetrahydroisoquinoline, or salt thereof, and aluminum acetylsalicylate, are to be employed, varying quantities of such other ingredients can be used. For example, in preparing the present products, one can use up to about 2.0 parts by weight of caffieine for each part by weight of 1-(4-chlorophenethyl) - 2 - methyl-6,7-dimethoxy-1,2,3,4-tetrahydroisoquinoline, or salt thereof, present therein. Where caffeine is used, however, it is preferred to employ from about 0.5 part to about 1.0 part by weight thereof for each part by weight of 1-(4-chlorophenethyl)-2-methyl-6,7-dimethoxy-1,2,3,4-tetrahydroisoquinoline, or salt thereof, present in the product. When 3,3-diethyl-5-methyl-2,4-piperidinedione is used in formulating the compositions of this invention, one can use up to 3.0 parts by weight thereof for each part by weight of 1-(4-chlorophenethyl)-2-methyl-6,7-dimethoxy-1,2,3,4-tetrahydroisoquinoline, or salt thereof, present. Where this compound is employed as an optional ingredient, however, it is preferred to use from about 0.7 part to about 2.0 parts by weight thereof for each part by weight of 1-(4-chlorophenethyl)-2-methyl - 6,7-dimethoxy-1,2,3,4-tetrahydroisoquinoline, or salt thereof, present.

Oral dosage forms of the therapeutic compositions of the present invention can be obtained quite readily. For the most part, the manner in which such dosage forms are prepared will be readily apparent to those skilled in the art. In general, the following method is preferably employed to produce, in tablet form, those compositions of this invention which contain aluminum acetylsalicylate and 1 - (4 - chlorophenethyl)-2-methyl-6,7-dimethoxy-1,2,3,4- tetrahydroisoquinoline, or a salt thereof, and, optionally, caffeine, as the therapeutically active ingredients. This method involves forming a mixture of the therapeutically active ingredients with suitable filler and binder materials. Ordinary cornstarch has been found to be useful as the filler. A gelatinized cornstarch of the type sold by Corn Products Sales Company, New York, New York, under the trade name "Amijel BO–11" has been found to be especially useful as the binder material. When substantially homogeneous, this mixture is granulated with water, screened and dried. Thereafter, lubricants, such as calcium stearate, talc, etc., are blended uniformly throughout the dry mixture. The dry mixture, thus obtained, is subsequently compressed into tablets, by any conventional means.

As a general rule, the procedure which is described in the immediately preceding paragraph will be applicable where aluminum acetylsalicylate and 1-(4-chlorophenethyl) - 2 - methyl-6,7-dimethoxy-1,2,3,4-tetrahydroisoquinoline, or an acid addition salt thereof, and optionally caffeine, are the active ingredients of the products. A modified procedure is recommended for use, however, where 3,3-diethyl-5-methyl-2,4-piperidinedione is to be incorporated into the product as an ingredient. Modification of the procedure is necessitated by the fact that 3,3-diethyl-5-methyl-2,4-piperidinedione has been found to be incompatible with aluminum acetylsilicylate. Accordingly, when producing, in tablet form, those preparations of this invention which contains 3,3-diethyl-5-methyl-2,4-piperidinedione, the latter compound is first mixed intimately with a filler, such as, coprecipitated aluminum hydroxide-calcium carbonate. This mixture is mixed with a binder, such as, a gelatinized cornstarch, and subsequently granulated with water, screened, dried and compressed into a small core or kernel. This core or kernel is, in turn, coated with a mixture, hereinafter referred to as a "presscoat," containing in addition to inert adjuvant materials, aluminum acetylsalicylate, 1-(4-chlorophenethyl)-2-methyl-6,7-dimethoxy-1,2,3,4-tetrahydroisoquinoline or an acid addition salt thereof, and, optionally, caffeine. The presscoat is prepared by blending the therapeutically active ingredients with pharmaceutical adjuvant materials, such as, cornstarch, gelatinized cornstarch, etc. The mixture, thus obtained, is granulated with, for example, water, dried, pulverized and blended with a suitable lubricant, such as calcium stearate, to yield the presscoat. The latter is then compressed into tablets, using the previously prepared kernel containing the 3,3-diethyl-5-methyl-2,4-piperidinedione as a core.

Where it is desired to produce compositions containing aluminum acetylsalicylate and 1-(4-chlorophenethyl)-2-methyl - 6,7 - dimethoxy-1,2,3,4-tetrahydroisoquinoline, or salt thereof, and, optionally, caffeine, in a form suitable for filling into hard-shell capsules, one need only blend the active ingredients of the products, using suitable fillers, if desired, and fill the preparations, thus obtained, into appropriate hard-shell capsules. On the other hand, since, as indicated heretofore, 3,3-diethyl-5-methyl-2,4-piperidinedione and aluminum acetylsalicylate are not compatible, it is not feasible to produce the compositions of the present invention which contain 3,3-diethyl-5-methyl-2,4-piperidine dione in a form suitable for filling into capsules.

It should be fully understood that the previously described procedures for producing the compositions of this invention in capsule or tablet forms are exemplary only. Other methods which can be used in formulating the products will be readily apparent to those skilled in the art.

As indicated heretofore, the products of the present invention possess an unexpectedly high degree of analgesic activity. For this reason, they will find widespread use for the relief of the mild to moderately severe degrees of acute, chronic or recurrent sensory experiences of pain, when the causative factors cannot be immediately controlled. The preparations have been found to be valuable as analgesics in the treatment of medical, surgical, dental, dermatological, gynecological, obstetrical, opthalmological, orthopedic, otolaryngological, neurological and urological patients, as well as in anesthesia cases.

Typical oral dosages of the present compositions will vary within rather wide limits. For example, in the case of a tablet or capsule containing about 30 mg. of 1-(4-chlorophenethyl) - 2 - methyl - 6,7 - dimethoxy - 1,2,3,4-tetrahydroisoquinoline, or a medicinally acceptable acid addition salt thereof, and 417 mg. of aluminum aspirin, a typical oral dosage for an adult would be up to two tablets or capsules every four hours, as required. In the case of children, age 6 to 12 years, a typical oral dosage of the same product would be one tablet or capsule every four hours, with up to four tablets or capsules being administered in any 24 hour period, if necessary. In the case of a tablet or capsule containing twice as much 1-(4 - chlorophenethyl) - 2 - methyl - 6,7 - dimethoxy-1,2,3,4-tetrahydroisoquinoline, or salt thereof, that is, 60 mg. of the tetrahydroisoquinoline product and 417 mg. of aluminum acetylsalicylate, a typical adult oral dosage would be one tablet or capsule every four hours. A typical oral dosage of the same product, in the case of children age 6 to 12 years, would be one tablet or capsule every four hours with up to three being administered in any twenty-four hour period.

In the case of a tablet containing, for example, 30 mg. of 1-(4-chlorophenethyl)-2-methyl-6,7-dimethoxy-1,2,3,4-tetrahydroisoquinoline, or a medicinally acceptable acid addition salt thereof, 417 mg. of aluminum aspirin, 50 mg. of 3,3-diethyl-5-methyl-2,4-piperidinedione and 30 mg. of caffeine, the typical oral dosage for both children and adults would be one tablet every four hours, with a maximum of four being administered in any twenty-four hour period. In the case of a tablet containing, for example, 60 mg. of 1-(4-chlorophenyl)-2-methyl-6,7-dimethoxy-1,2,3,4-tetrahydroisoquinoline, or a salt thereof, 417 mg. of aluminum aspirin, 50 mg. of 3,3-diethyl-5-methyl-2,4-piperidinedione and 30 mg. of caffeine, a typical adult oral dosage would be one tablet every four hours, with up to four being administered in any twenty-four period. The typical oral dosage of the same product in the case of a child would be one tablet every four hours, with up to three being administered in any twenty-four hour period.

It should be fully understood, however, that the dosages set forth in the preceding paragraphs are exemplary only and that they do not, to any extent, limit the scope of the present invention.

For a fuller understanding of the nature and objects of this invention, reference may be had to the following examples which are given merely as further illustrations of the invention and are not to be construed in a limiting sense.

*Example I*

In this example, 7,650 grams of 1-(4-chlorophenethyl)-2 - methyl - 6,7 - dimethoxy - 1,2,3,4 - tetrahydroisoquinoline were admixed with 18,500 grams of Amijel BO–11 (a gelatinized cornstarch sold by Corn Products Sales Company, New York, New York), and 15,900 grams of starch, U.S.P. The mixture was passed through a comminuting machine to break up the aggregates. Thereafter, a blend of 15,981 grams of cornstarch and 111,719 grams of aluminum acetylsalicylate were added to the mixture. The blend was next granulated with a distilled water, milled and then dried for 16 hours at a temperature of about 110° F.

The dry granules were passed through a comminuting machine and transferred to a suitable blender. Thereafter, 1,750 grams of calcium stearate and 5,250 grams of hydrogenated vegetable oil (a powdered vegetable stearine, sold under the trade name "Stero-tex" by Capitol City Products Co., Columbus, Ohio), were added thereto. The product was mixed until homogeneous and compressed into tablets at 707 mg. on a one-half inch standard concave punch.

Example 2

In this example, tablets were prepared in the following manner. A premix was prepared by blending the following named ingredients in the quantities hereinafter indicated.

| | Grams |
|---|---|
| 1-(4-chlorophenethyl)-2-methyl-6,7-dimethoxy-1,2,3,4-tetrahydroisoquinoline | 15,300 |
| Amijel BO-11 | 18,500 |
| Starch | 15,900 |

This premix was passed through a comminuting machine to break up the aggregates. Thereafter, a blend of 12,116 grams of cornstarch and 111,719 grams of aluminum acetylsalicylate was added to, and mixed with, the premix. The mixture, thus obtained, was granulated with distilled water, following which the wet granules were milled and then dried for 16 hours at a temperature of about 110° F.

The dry granules were next comminuted, transferred to a suitable blender and mixed with 1,750 grams of calcium stearate and 5,250 grams of hydrogenated vegetable oil ("Stero-tex").

When homogeneous, the mixture was compressed in tablets at 707 mg. on a one-half inch standard concave punch.

Example 3

In this example, a mixture containing the following named ingredients, in the quantities indicated, was first prepared.

| | Kg. |
|---|---|
| 3,3-diethyl-5-methyl-2,4-piperidinedione | 5.25 |
| Coprecipitated aluminum hydroxide-calcium carbonate | 2.125 |
| Amijel BO-11 | 0.900 |

After mixing, the blend was passed through a Fitzpatrick Comminuting Machine fitted with a No. 1A screen, with impact forward. The mixed powder was reblended, granulated with distilled water and again comminuted. The moist mass was dried at a temperature of 110° F. and, thereafter, the dry mass was passed through a Fitzpatrick Model D Comminuting Machine fitted with a No. 8 screen. The granules were then mixed with 4.425 kg. of calcium stearate until the mixture was uniform. The granular product was then compressed on a Stokes RBB₂ rotary tablet press fitted with 15/64" (5.95 mm.) diameter, standard concave punches. Kernels containing 3,3-diethyl-5-methyl-2,4-piperidinedione were thus obtained.

A presscoat for these kernels was prepared in the following manner. The following named ingredients were mixed, in the quantities indicated, in a stainless steel container.

| | Kg. |
|---|---|
| 1-(4-chlorophenethyl)-2-methyl-6,7-dimethoxy-1,2,3,4-tetrahydroisoquinoline | 3.060 |
| Aluminum acetylsalicylate | 44.6875 |
| Caffeine | 3.060 |
| Amijel BO-11 | 4.000 |
| Starch, U.S.P. | 7.3362 |
| FD & C Yellow No. 5, Lake | 0.141 |
| FD & C Blue No. 1, Lake | 0.0153 |

The powdery blend, thus obtained, was passed through a Fitzpatrick Comminuting Machine fitted with a No. 1A screen, with impact forward. The mixture was reblended and granulated with distilled water. The moist mass was then passed through a comminuting machine and, thereafter, it was dried at a temperature of about 110° F. The dry mass was then passed through a Fitzpatrick Model D Comminuting Machine fitted with a No. 8 screen. The granules were then mixed, until uniform, with 1.800 kg. of hydrogenated vegetable oil ("Stero-tex") and 1.200 kg. of calcium stearate.

The mixture, thus obtained, was compressed over the kernel containing 3,3-diethyl-5-methyl-2,4-piperidinedione, described heretofore, on a Stokes Model 538 dry tablet coating machine, fitted with a one-half inch diameter, round, flat-faced, beveled-edge punch.

Example 4

In this example, tablets were prepared by the method described in Example 3. The same ingredients, and the same quantities thereof were used in producing the tablets of this example as were used in Example 3, except as follows:

6.120 kg. of 1-(4-chlorophenethyl)-2-methyl-6,7-dimethoxy-1,2,3,4-tetrahydroisoquinoline were used in preparing the presscoat of this example rather than the 3.060 kg. of the same product used in Example 3.

4.4325 kg. of starch, U.S.P., were used in preparing the presscoat of this example rather than the 7.3362 kg. of starch, U.S.P., used in Example 3.

The coloring agents, namely, FD & C Yellow No. 5, Lake, and FD & C Blue No. 1, Lake, used in Example 3 were not used in formulating the presscoat of this example.

Example 5

In this example, a mixture was prepared using the following named ingredients, in the quantities hereinafter indicated.

| | Mg. |
|---|---|
| 1-(4-chlorophenethyl)-2-methyl-6,7-dimethoxy-1,2,3,4-tetrahydroisoquinoline | 30 |
| Aluminum acetylsalicylate | 417 |
| Lactose | 80 |
| Talc | 30 |

When homogeneous, the mixture was filled into No. 0 hard-shell capsules.

Example 6

In this example, a mixture was prepared using the following named ingredients, in the quantities hereinafter indicated.

| | Mg. |
|---|---|
| 1-(4-chlorophenethyl)-2-methyl-6,7-dimethoxy-1,2,3,4-tetrahydroisoquinoline | 30 |
| Aluminum acetylsalicylate | 417 |
| Caffeine | 30 |
| Calcium stearate | 5 |
| Lactose | 20 |
| Talc | 5 |

This mixture was milled through a comminuting machine, reblended and filled into No. 0 hard-shell capsules.

Example 7

In this example, a mixture was first prepared using the following named ingredients, in the quantities hereinafter indicated.

| | Mg. |
|---|---|
| 3,3-diethyl-5-methyl-1,2,4-piperidinedione | 50 |
| Calcium silicate | 30 |

This mixture was thoroughly blended and subsequently granulated using a 5.0%, by weight, aqueous solution of gum acacia. The granulate was dried overnight at a temperature of about 100° F., following which it was ground through a 14 mesh screen. This mixture was then mixed with 2.0 mg. of calcium stearate and the blend, thus obtained, was compressed to kernels on a 15/64" diameter punch.

A presscoat for these kernels was prepared in the following manner. The following named ingredients were mixed, in the quantities indicated, in a suitable vessel.

| | Mg. |
|---|---|
| 1-(4-chlorophenethyl)-2-methyl-6,7-dimethoxy-1,2,3,4-tetrahydroisoquinoline | 60 |
| Aluminum acetylsalicylate | 417 |
| Amijel BO-11 | 40 |
| Cornstarch | 73 |

This mixture was thoroughly blended, following which it was ground through an 80 mesh screen. The mixture was then granulated with distilled water, and the moistened mass was ground through a 12 mesh screen. The mixture was thereafter dried at a temperature of 110° F. and re-ground through a 14 mesh screen. The mixture was mixed, until uniform, with 1.2 mg. of calcium stearate and 1.8 mg. of hydrogenated vegetable oil ("Stero-tex").

The mixture, thus obtained, was compressed into tablets, using the previously prepared kernel containing 3,3-diethyl-5-methyl-1,2,4-piperidinedione as a core.

We claim:

1. A therapeutic composition comprising mono-hydroxy aluminum di-acetylsalicylate and a compound selected from the group consisting of 1-(4-chlorophenethyl)-2-methyl-6,7-dimethoxy-1,2,3,4-tetrahydroisoquinoline and an acid addition salt thereof with a medicinally acceptable acid, there being present in said composition, for each part by weight of 1,2,3,4-tetrahydroisoquinoline compound present therein, from about 4.0 to about 20.0 parts by weight of said mono-hydroxy aluminum di-acetylsalicylate.

2. The composition of claim 1 which contains additionally a compound selected from the group consisting of caffeine, 3,3-diethyl-5-methyl-2,4-piperidinedione and mixtures thereof.

3. A therapeutic composition comprising mono-hydroxy aluminum diacetylsalicylate and 1-(4-chlorophenethyl)-2-methyl-6,7-dimethoxy-1,2,3,4-tetrahydroisoquinoline, there being present in said composition, for each part by weight of 1,2,3,4-tetrahydroisoquinoline compound present therein, from about 4.0 to about 20.0 parts by weight of said mono-hydroxy aluminum di-acetylsalicylate.

4. A therapeutic composition comprising mono-hydroxy aluminum di-acetylsalicylate, 1-(4-chlorophenethyl)-2-methyl-6,7-dimethoxy-1,2,3,4-tetrahydroisoquinoline and caffeine, there being present in said composition, for each part by weight of 1,2,3,4-tetrahydroisoquinoline compound present therein, from about 4.0 to about 20.0 parts by weight of said mono-hydroxy aluminum di-acetylsalicylate and up to about 2.0 parts by weight of caffeine.

5. A therapeutic composition comprising mono-hydroxy aluminum di-acetylsalicylate, 1-(4-chlorophenethyl)-2-methyl-6,7-dimethoxy-1,2,3,4-tetrahydroisoquinoline and 3,3-diethyl-5-methyl-2,4-piperidinedione, there being present in said composition, for each part by weight of 1,2,3,4-tetrahydroisoquinoline compound present therein, from about 4.0 to about 20.0 parts by weight of said mono-hydroxy aluminum di-acetylsalicylate and up to about 3.0 parts by weight of said 2,4-piperidinedione compound.

6. A therapeutic composition comprising mono-hydroxy aluminum di-acetylsalicylate, 1-4-chlorophenethyl)-2-methyl-6,7-dimethoxy-1,2,3,4-tetrahydroisoquinoline, caffeine and 3,3-diethyl-5-methyl-2,4-piperidinedione, there being present in said composition for each part by weight of said 1,2,3,4-tetrahydroisoquinoline present therein, from about 4.0 to about 20.0 parts by weight of said mono-hydroxy aluminum di-acetylsalicylate, up to about 2.0 parts by weight of said caffeine and up to about 3.0 parts by weight of said 2,4-piperidinedione compound.

7. A therapeutic composition for oral administration in unit dosage form comprising a mixture of (1) mono-hydroxy aluminum di-acetylsalicylate and (2) a compound selected from the group consisting of 1-(4-chlorophenethyl)-2-methyl-6,7-dimethoxy-1,2,3,4-tetrahydroisoquinoline and an acid addition salt thereof with a medicinally acceptable acids with (3) solid pharmaceutical adjuvant materials, there being present in said composition, for each part by weight of said 1,2,3,4-tetrahydroisoquinoline compound, from about 4.0 to about 20.0 parts by weight of said mono-hydroxy aluminum di-acetylsalicylate.

8. The composition of claim 7 which contains a compound selected from the group consisting of caffeine, 3,3-diethyl-5-methyl-2,4-piperidinedione and mixtures thereof.

9. A therapeutic composition for oral administration in shaped unit dosage form comprising a mixture of (1) mono-hydroxy aluminum di-acetylsalicylate and (2) a compound selected from the group consisting of 1-(4-chlorophenethyl)-2-methyl-6,7-dimethoxy - 1,2,3,4 - tetrahydroisoquinoline and an acid addition salt thereof with a medicinally acceptable acid with (3) solid pharmaceutical adjuvant materials, there being present in said composition, for each part by weight of said 1,2,3,4-tetrahydroisoquinoline compound, from about 4.0 to about 20.0 parts by weight of said mono-hydroxy aluminum di-acetylsalicylate.

10. The composition of claim 9 which contains a compound selected from the group consisting of caffeine, 3,3-diethyl-5-methyl - 2,4 - piperidinedione and mixtures thereof.

References Cited in the file of this patent

FOREIGN PATENTS 862,052    Great Britain _____ Mar. 1, 1961

OTHER REFERENCES

Chem. Abst., vol. 54, 1960, p. 16430f, POSL.

Physician Desk References, Jan. 23, 1961, page 710.

Wilson et al.: American Drug Index, Mar. 3, 1961, page 32.

Sadove: Current Therap. Res., vol. 3, November 12, pp. 507–511, December 1961, P.O.S.L.

UNITED STATES PATENT OFFICE
CERTIFICATE OF CORRECTION

Patent No. 3,138,530 June 23, 1964

Saul Howard Rubin et al.

It is hereby certified that error appears in the above numbered patent requiring correction and that the said Letters Patent should read as corrected below.

Column 1, line 55, for "1-(4-chlorphenethyl)" read -- 1-(4-chlorophenethyl) --; column 3, line 29, for "contains" read -- contain --; column 4, line 35, for "1-(4-chlorophenyl)-" read -- 1-(4-chlorophenethyl)- --; line 64, strike out "a"; column 5, line 13, for "Thereafater" read -- Thereafter --; line 44, for "4.425 kg." read -- 0.425 kg. --; column 6, line 56, and column 7, line 11, for "-1,2,4-", each occurrence, read -- -2,4- --; column 8, line 17, for "acids" read -- acid --; line 51, for "November 12," read -- No. 12, --.

Signed and sealed this 8th day of December 1964.

(SEAL)
Attest:

ERNEST W. SWIDER
Attesting Officer

EDWARD J. BRENNER
Commissioner of Patents